Nov. 27, 1962  D. B. LANGMUIR ET AL  3,065,640
CONTAINMENT DEVICE
Filed Aug. 27, 1959  9 Sheets-Sheet 1

DAVID B. LANGMUIR
ROBERT V. LANGMUIR
HAYWOOD SHELTON
RALPH F. WUERKER
INVENTORS

BY David P. Ogden
Morris Liston
ATTORNEYS

Nov. 27, 1962     D. B. LANGMUIR ET AL     3,065,640
CONTAINMENT DEVICE
Filed Aug. 27, 1959     9 Sheets-Sheet 5

DAVID B. LANGMUIR
ROBERT V. LANGMUIR
HAYWOOD SHELTON
RALPH F. WUERKER
INVENTORS

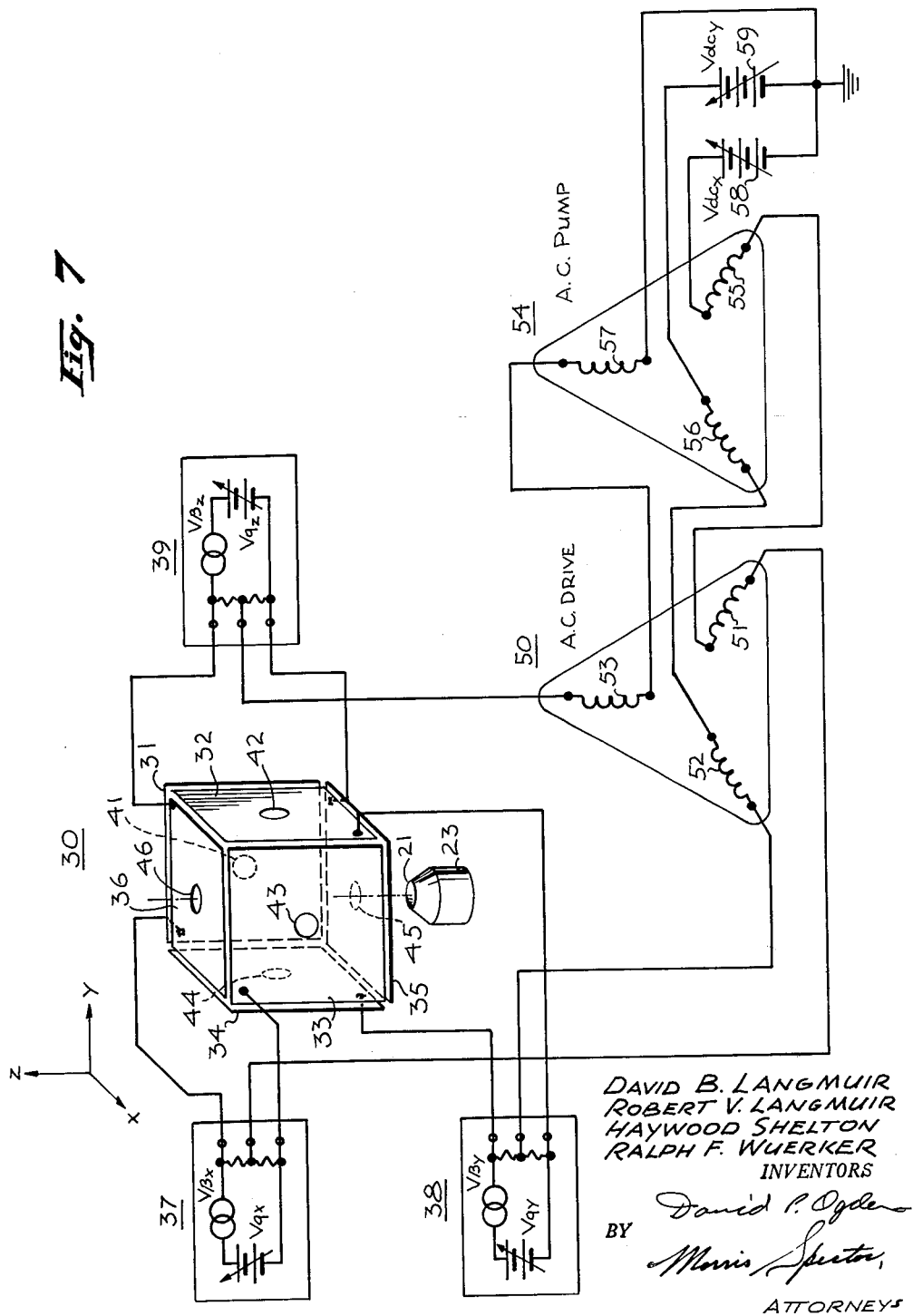

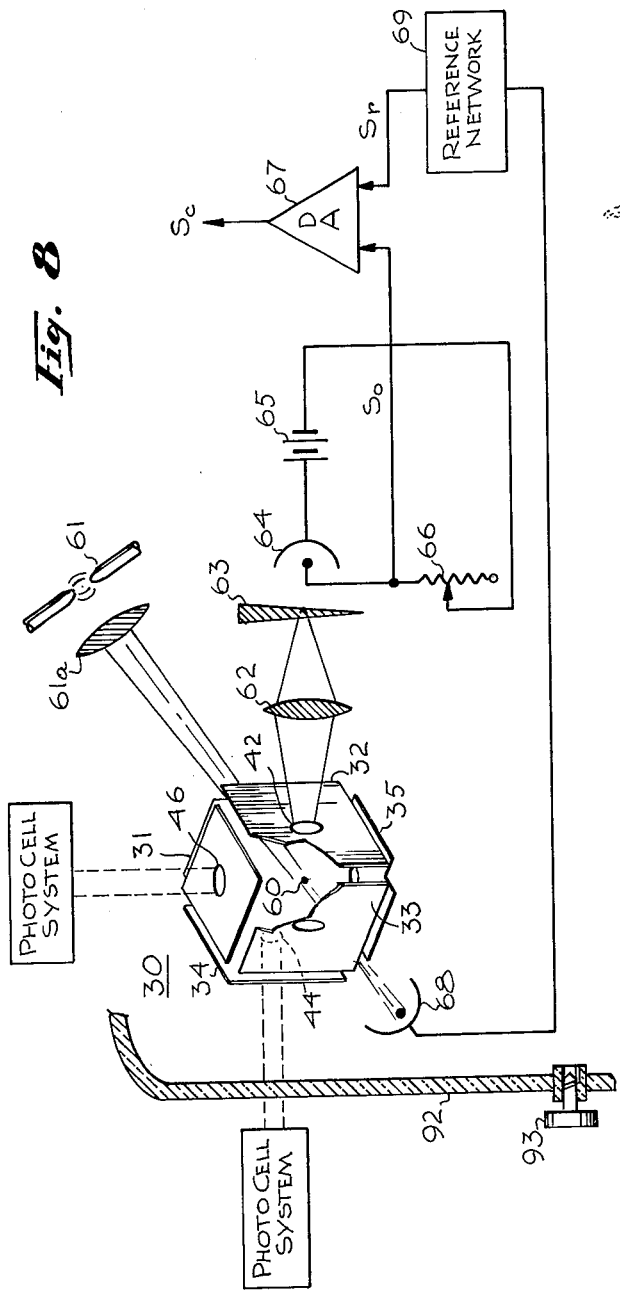

Nov. 27, 1962

D. B. LANGMUIR ET AL 3,065,640

CONTAINMENT DEVICE

Filed Aug. 27, 1959

DAVID B. LANGMUIR
ROBERT V. LANGMUIR
HAYWOOD SHELTON
RALPH F. WUERKER
INVENTORS

BY David P. Ogden
Morris Spector,
ATTORNEYS

United States Patent Office 3,065,640
Patented Nov. 27, 1962.

3,065,640
CONTAINMENT DEVICE
David B. Langmuir, Santa Monica, Robert V. Langmuir, Altadena, Haywood Shelton, Woodland Hills, and Ralph F. Wuerker, Palos Verdes Estates, Calif., assignors to Thompson Ramo Wooldridge Inc., Los Angeles, Calif., a corporation of Ohio
Filed Aug. 27, 1959, Ser. No. 836,486
22 Claims. (Cl. 73—517)

The present invention relates to a particle containment device and more particularly to a device providing for the electrodynamic containment of charged particles with an arrangement for placing the charged particles within the confinement space and observing such particles.

The containment device described herein offers a new approach to colloid physics, mass spectroscopy, ion source physics, and low density plasma physics. According to the present invention, charged particles can be dynamically contained by alternating electric fields which pass through the confinement volume in accordance with voltages applied to the surrounding metallic electrode walls. In a specific application, visually observable charged particles of iron, aluminum, and/or latex several microns in diameter were contained either singly or in groups. In such an application it is feasible to investigate as a function of the operating conditions the motions, the resonant frequencies, and in the case of a plasma of many particles the ordered arrays. In another application, neutral gases of low atomic weight were used in studying, as a function of the operating conditions, the formation and generation of such exotic ions as He⁻ (negative ion of helium), H⁻ (the negative hydrogen ion), and $H_3^+$.

The construction of an electro-dynamic containment device provided with means for inserting charged particles therein and means for allowing observation of the motion of the particles has proved to be a challenging task. Prior art illustrates methods for containing ions within D.C. and simple A.C. voltage fields emanating from hyperbolic electrodes. Many of the problems encountered in this type of device have prevented fabrication of a simple mechanism allowing studies of the particle motion.

Therefore, an object of the present invention is to provide a simple and reliable particle containment and observation device wherein various surfaces thereof have applied thereto voltages of controllable frequency and magnitude.

A further object of the present invention is to provide the combination of a particle containment chamber and means for injecting into this chamber charged particles.

Another object of the present invention is to provide the combination of a charged particle containment device and means for observing particles within the device.

Still another object of the present invention is to provide a means of ejecting as a group the charged particles which were formed and held within the confinement space.

A more specific object is the provision of an accelerometer.

Briefly, in accordance with one embodiment of the present invention, the charged particle containment device comprises a cubical structure defined by three mutually perpendicular pairs of surfaces energized by a frequency and magnitude controllable three-phase A.C. voltage as well as D.C. voltage selectively applied thereto. Charged particles injected into the center of the space defined will oscillate in a predeterminable manner. At least one of the surfaces is provided with a central aperture through which the charged particles may be injected. Also one of the surfaces has a central aperture through which any particles within the cubical space may be illuminated and another surface has an observation aperture.

In order that the charged particle or particles within the cube may be studied, it is preferred that both unidirectional and alternating voltages be selectively variable so that the types of particle motion may be controlled and so that the group of charged particles within a stable region of operation of the device may be compressed or expanded.

The subject mater which is regarded as a portion of this invention is particularly pointed out and distinctly claimed in the concluding portion of the specification. The invention, however, as to its organization and method of operation, together with further objects and advantages thereof will best be understood by reference to the following description taken in connection with the accompanying drawings, in which:

FIG. 7 is a schematic diagram of another embodiment of the present invention;

FIG. 8 is a schematic diagram of an accelerometer utilizing the embodiment of the present invention shown in FIG. 7;

FIG. 10 illustrates a typical crystal-like array of several particles within the suspension device of FIG. 7.

Figure 1:
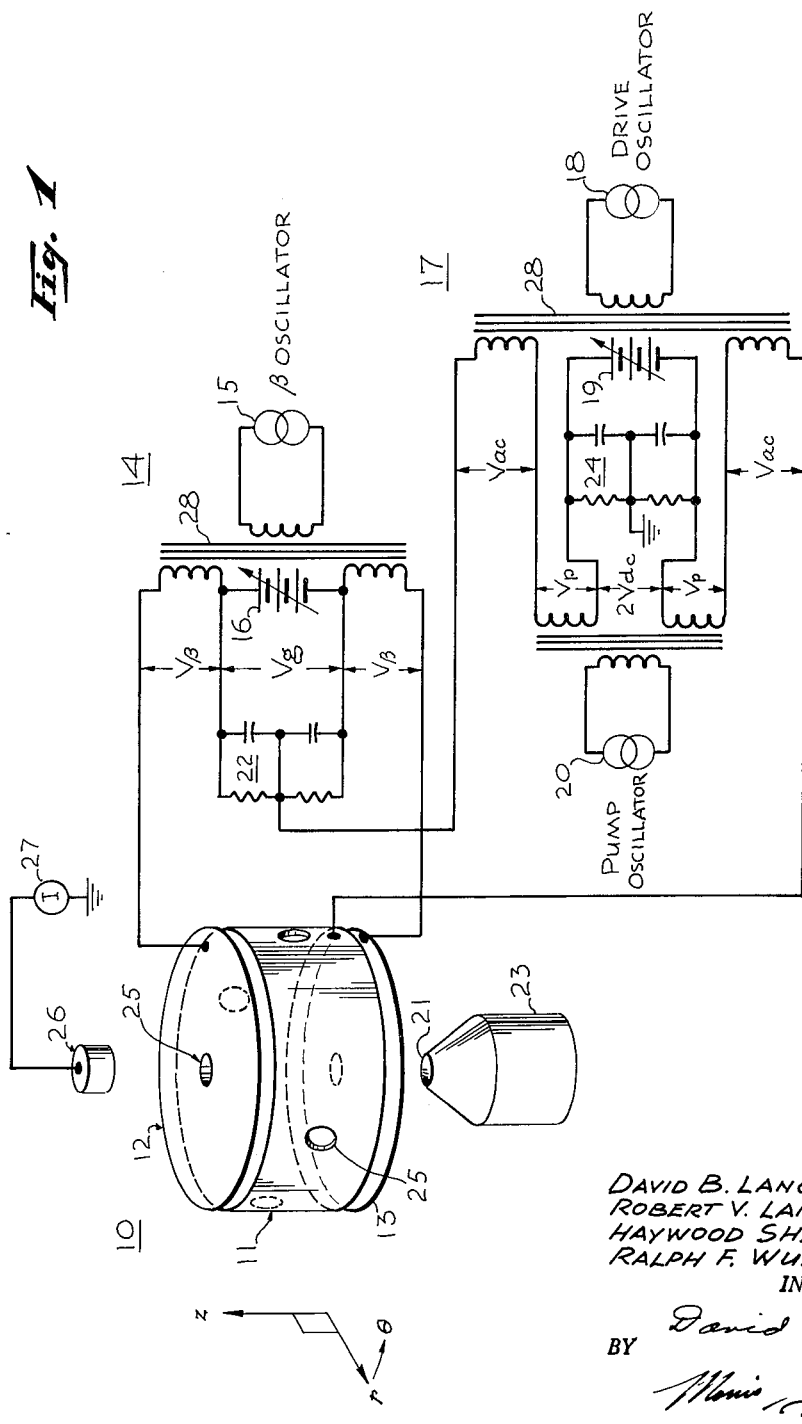
FIG. 1 is a schematic diagram of one embodiment of the present invention.

Referring now to the drawings, in which like numerals indicate identical parts, in FIG. 1 there is shown a hollow container such as a cylindrical pill box 10 having a vertical surface or ring electrode 11 between a top surface cap 12 and a bottom surface cap 13, thus defining a space suitable for particle containment. The top surface cap 12 and the bottom surface cap 13 are connected by electric circuit means 14 including a beta oscillator 15 providing a voltage $2V_\beta$ and a unidirectional power supply 16 providing a voltage $V_g$. The vertical side surface 11 is electrically connected to the electric circuit means 14 by electric circuit means 17 including a driving oscillator 18 providing a voltage $2V_{ac}$, a unidirectional voltage source 19 providing a voltage $2V_{dc}$, and a pump oscillator 20 providing a voltage $2V_p$ measured between the electrodes 11 and 12 or 13. The electric fields near the center of this structure may be selected to support charged particles inserted from an aperture 21 of a charged particle source 23, such as a powder reservoir and injector, or an ion gun, or an electron gun, through one of the apertures 25. Also there are provided filters 22 and 24 in the electric circuit means 14 and 17 respectively to isolate the alternating and unidirectional voltages.

As will become more apparent from the following discussion, the contained charged particles can be detected and studied by the following techniques or combinations of methods:

(1) By observing directly with the aid of a microscope through one of the apertures 25;

(2) By observing and/or measuring the loading on the β oscillator 15 when its frequency is tuned to any one of the characteristic resonant frequencies which the contained particles can have in the z direction;

(3) By noting the loading on the pump oscillator 20 when its frequency is adjusted to either twice or equal to the resonant frequency of the ions in either the vertical or radial (z or r) directions;

(4) By measuring the transfer of electrical energy between the pump oscillator 20 and the β circuit 14 when the frequency of the former is adjusted to twice the resonant frequency of the contained particles in the z direction and the frequency of the latter is adjusted to equal the particle resonant frequency;

(5) By properly increasing the voltages $V_g$ and $2V_{dc}$ so that particles are ejected out of the chamber through the aperture 25 in the top surface cap 12 and collected on an external electrode or Faraday cup 26 to which is connected a sensitive galvanometer or ammeter 27.

It is recognized that the elements 28 shown schematically as transformers can consist of high frequency resonant elements or resonant cavities dependent upon the frequency of the system as determined by the charge to mass ratio of the particles under observation.

The relation between the electric fields and the particle mass and charge is mathematically definable. If the surfaces of the device shown in FIG. 1 are curved inwardly the following mathematical discussion applies to a slightly larger volume than in the case of the cylindrical structure.

The necessary condition for the proper operation of this type of electric field containment system depends upon having an electrode structure which gives time varying forces at least near the center of the container whose strengths are proportional to the distance from the center (i.e., the origin). When these time varying forces are sinusoidal the differential equations of particle motion in the three independent directions of space are each special cases of the Mathieu differential equation. A three-dimensional electrical field distribution which satisfies this requirement is the axially symmetric potential distribution $$V(z,r,t) = \frac{-V_{ac}}{Z_0^2}\left[z^2 - \frac{r^2}{2}\right]\cos \Omega t \quad (1)$$

formed by the electrode surfaces 11, 12, and 13 as shown in FIG. 1. The quantities in Equation 1 have the following meanings: $V_{ac}$ is one-half the peak value of the alternating voltage of angular frequency $\Omega$ applied between the ring electrode 11 and the end surface caps 12 and 13; $Z_0$, the characteristic dimension of the electrode structure, is approximately equal to half the distance between electrode surface caps 12 and 13; z and r are respectively the vertical and horizontal displacements of the particle from the geometrical center of the chamber. Differentiation of Equation 1 shows that the electric fields have the required spacial dependence and are respectively $$E_z = \frac{-\partial V(z,r,t)}{\partial z} = \frac{2V_{ac}}{Z_0^2}z\cos \Omega t \quad (2)$$

and $$E_r = \frac{-\partial V(z,r,t)}{\partial r} = \frac{-V_{ac}}{Z_0^2}r\cos \Omega t \quad (3)$$

The negative 2:1 ratio between Equations 2 and 3 shows that when the electric field is focusing toward the origin in the z direction then it must be defocusing in the r direction and vice versa. The addition of other sources in series with the alternating drive adds more terms of the same spatial form as Equation 1 to the expression for the electrical potential within the confining electrode structure. For example, the insertion of the D.C. source 19 in series with the A.C. driving supply 18 merely adds a time independent term of the same form to Equation 1.

The differential equations of motion of a single charged particle of charge to mass ratio $e/m$ within the potential field of the electrode structure 11, 12 and 13 when only the external sources 18 and 19 are present, are $$\frac{d^2z}{dt^2} = \left(\frac{e}{m}\right)\left(\frac{2V_{dc}}{Z_0^2}\right)z + \left(\frac{e}{m}\right)\left(\frac{2V_{ac}}{Z_0^2}\right)z \cos \Omega t \quad (4)$$

and $$\frac{d^2r}{dt^2} = \left(\frac{e}{m}\right)\left(\frac{V_{dc}}{Z_0^2}\right)r - \left(\frac{e}{m}\right)\left(\frac{V_{ac}}{Z_0^2}\right)r \cos \Omega t \quad (5)$$

The equations of motion of a single particle in the two directions of space are seen to be identical except for the negative 2:1 ratio between the constants. Equation 4 is a function of z only, while (5) is a function of r only. The motions in z and r are therefore mutually independent. Each of the above equations is thus a special case of the Mathieu differential equation which in its general form is usually written $$\frac{d^2u}{d\xi^2} + (a - 2q\cos 2\xi)u = 0 \quad (6)$$

in which u may represent either z or r. The dimensionless constants in the above equation are related to those of the present physical problem through the transformation equations $$\xi = \Omega t/2 \quad (7)$$

$$a_z = -2a_r = 8\left(\frac{e}{m}\right)\left(\frac{V_{dc}}{Z_0^2}\right)\frac{1}{\Omega^2} \quad (8)$$

$$q_z = -2q_r = 4\left(\frac{e}{m}\right)\left(\frac{V_{ac}}{Z_0^2}\right)\frac{1}{\Omega^2} \quad (9)$$

Inspection of Equation 6 shows that it reduces to a simple second order linear differential equation when the driving term q becomes zero. For this limiting case, the differential equation has stable or unstable solutions of the forms $$u = A \sin(\beta \xi + \varphi) \quad (10)$$

or $$u = L\epsilon^{\sqrt{a}\xi} + M\epsilon^{-\sqrt{a}\xi} \quad (11)$$

The quantity $\epsilon = 2.718 \ldots$ depending on whether a is respectively positive or negative. When a is positive and q is zero the motion is bounded and the particle vibrates sinusoidally with simple harmonic motion of normalized frequency β which can be related to the real angular frequency of oscillation through the transformation Equation 7; namely, $$\omega_\beta = \beta \Omega / 2 \quad (12)$$

For example, in the case of the containment chamber shown in FIG. 1 when $V_{ac} = 0$ and $V_{dc}$ is focusing in the vertical z direction (i.e., $a_z$ positive and $a_r$ negative) the particle will execute the following motions in the two independent directions $$z = A \sin(\omega_\beta t + \varphi) = A \sin\left[\left\{\left(\frac{e}{m}\right)\frac{2V_{dc}}{Z_0^2}\right\}^{1/2} t + \varphi\right] \quad (13)$$

and $$r = L\epsilon^{\sqrt{\left(\frac{e}{m}\right)\left(\frac{V_{dc}}{Z_0^2}\right)}t} + M\epsilon^{-\sqrt{\left(\frac{e}{m}\right)\left(\frac{V_{ac}}{Z_0^2}\right)}t} \quad (14)$$

where A, φ, L and M are constants of integration whose values are determined by the initial conditions. The above example is merely an expression of Earnshaw's theorem of electrostatics which states that with only a D.C. source a charged particle can never be stably confined.

Figure 2:
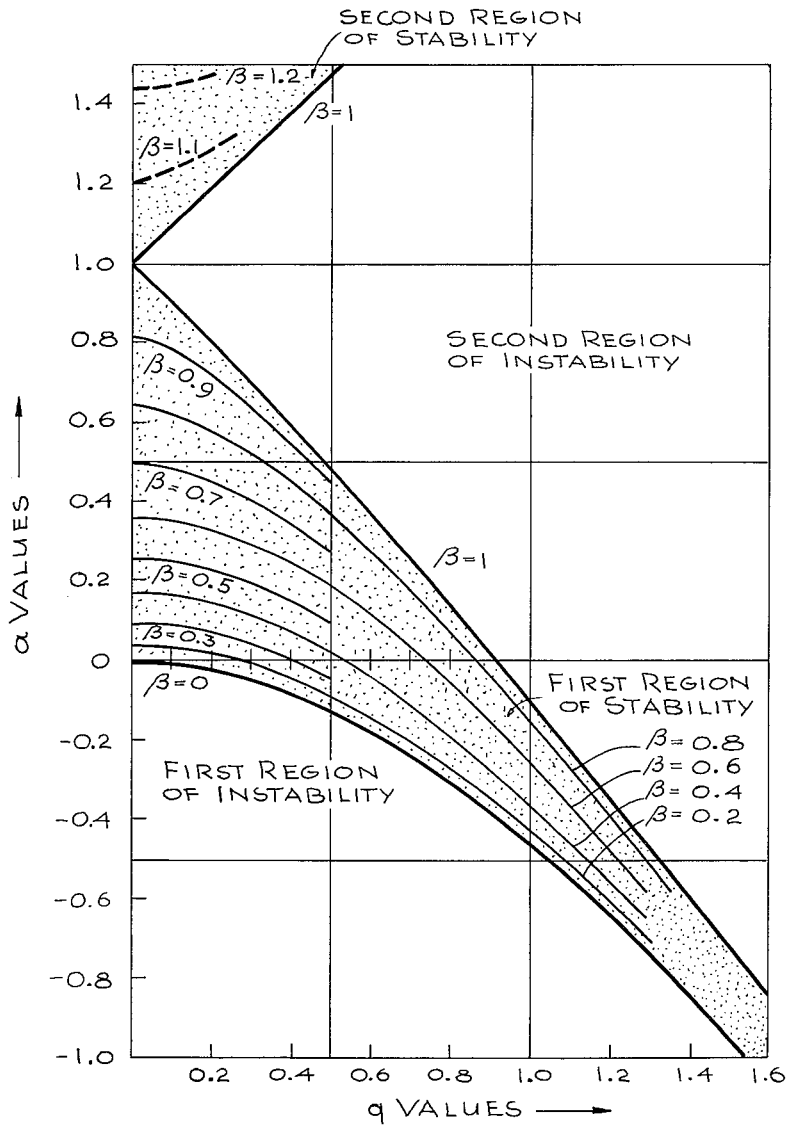
FIG. 2 is a graph of the stability diagram for the Mathieu differential equation.

The constant a in Equation 6 therefore represents the contribution of either static focusing or defocusing forces depending on its sign. The constant $q$ on the other hand carries the contribution of forces which vary sinusoidally with a normalized period of $\pi$ ($\pi = 3.1416\ldots$). The Mathieu Equation 6 is solvable in terms of an infinite Fourier series and has solutions which are either stable or unstable depending upon the numerical values of $a$ and $q$ (see McLachlan, N.W., Theory and Applications of Mathieu Functions, Oxford, 1947). FIG. 2 shows a region of the stability diagram for Equation 6 in terms of the normalized $a$—$q$ values. The shaded areas represent the regions corresponding to values of $a$ and $q$ yielding stable solutions. In this figure the curves labeled $\beta = 0$ and $\beta = 1$ bound the stability domain which is employed in the present device. Within this region the solution of the Mathieu equation is of the form $$u = A \cos \beta \xi \left[ 1 - \frac{(\beta^2 - a)}{q} \cos 2\xi - \frac{8q\beta}{(a-4)^2} \sin 2\xi \ldots \right] \quad (15)$$

The stable motion according to this expression is seen to consist of a harmonic oscillation at the normalized $\beta$ frequency upon which is superimposed smaller vibrations at frequencies $2-\beta$, $2+\beta$, $4-\beta$, $4+\beta$, etc. The fundamental or resultant frequency of motion $\beta$ is a function of the $a$ and $q$ parameters as shown graphically in FIG. 2 by the curves labeled $\beta=0$, $\beta=0.2$, $\beta=0.3$, $\beta=0.4$, etc. That is to say, the iso-$\beta$ curves trace out the loci of $a$—$q$ values which give the same normalized resultant frequency of motion. In the region of small $q$, the functional dependence of $\beta$ on the operating parameters can be shown to be approximately $$\beta \simeq \sqrt{a + q^2/2} \quad (16)$$

when $q \leq \frac{1}{2}$. The line $\beta = 0$ has the physical significance that the effective binding due to the driving $q$ term is exactly cancelled by the defocusing action of the static negative $a$ term.

Figure 3:
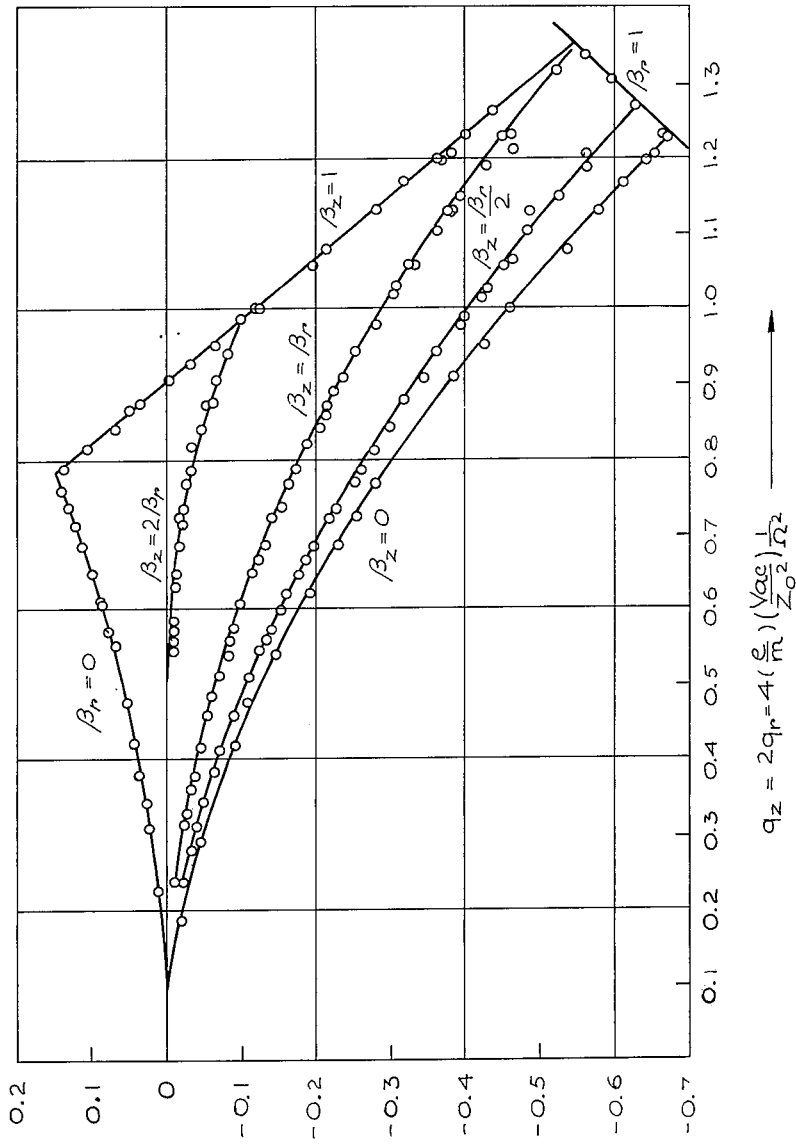
FIG. 3 is a curve illustrating regions of stable oscillation within the device shown in FIG. 1.
Figure 4:
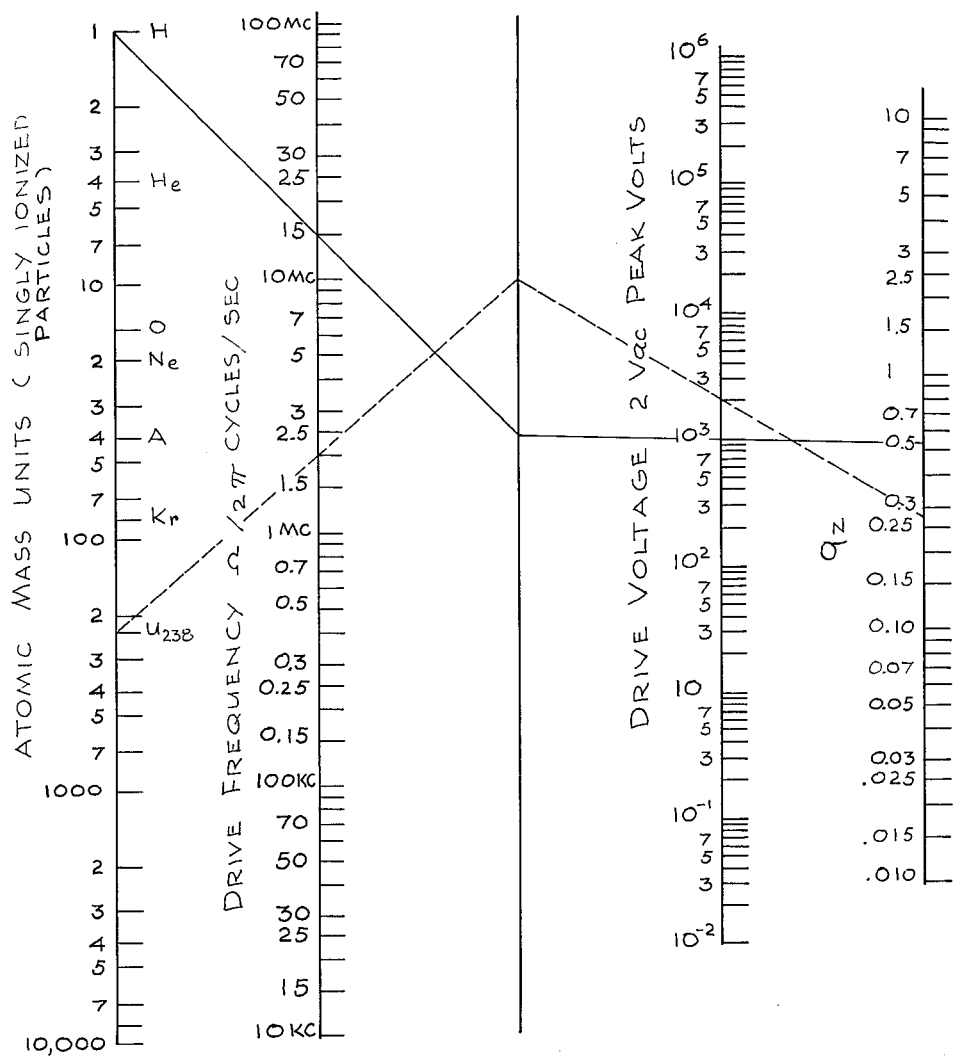
FIG. 4 is a nomogram for computing the parametric $q_z$ values of a chamber of characteristic dimension $Z_0 = \frac{1}{4}$ inch.

For the containment device shown in FIG. 1, the question of $a_z$, $a_r$, $q_z$ and $q_r$ values giving stable motions simultaneously in all three dimensions of space is most simply presented by a single Cartesian graph plotted in terms of the $a_z$ and $q_z$ values which correspond to the limiting curves $\beta_z = 0$, $\beta_z = 1$, $\beta_r = 0$, and $\beta_r = 1$. For this case, the limiting curves for the $r$ motion are expressed in terms of $a_z$ and $q_z$ through the negative two to one relationship between the parameters, i.e., $a_r = -a_z/2$ and $q_r = q_z/2$ in accordance to Equations 8 and 9. FIG. 3 shows the resulting common stability plot for the axially symmetric potential distribution having the form of Equation 1. The circles represent experimental determinations using single charged particles of dust of the stability boundaries. The experimental curves lying within this "necktie" diagram show the visually determined loci of points for which the resultant frequencies in the $z$ and $r$ directions are respectively in the ratios of 2:1, 1:1, and 1:2. FIG. 4 presents a nomogram for finding the $q_z$ values within a single phase containment chamber of characteristic dimension where $Z_0 = 0.250$ inch. The use of this graph is shown by the solid line for the case of singly ionized hydrogen ions when the drive frequency $\Omega/2\pi = 15$ megacycles and $2V_{ac} = 1000$ volts peak. For this case $q_z = 0.535$. Also the use of the graph is indicated in a dashed line for uranium when the drive frequency $\Omega/2\pi = 1$ megacycle and $2V_{ac} = 2000$ volts peak. In the case of uranium $q_z = 0.274$. This graph enables one to quickly explore the driving frequencies and voltages required to contain any of the atomic or molecular ions within a container of given size.

The following table further illustrates the range of drive frequency encountered with particles of widely different charge to mass ratios when the field gradient is $2V_{ac}/Z_0^2 = 2.480$ volts/cm.$^2$.

| Particle | Atomic Mass Units | $e/m$ coulombs/-kilogram | Drive Frequency/$2\pi$ for $q_z=0.535$ |
|---|---|---|---|
| Electron ($e^-$) | 0.000549 | $1.76 \times 10^{11}$ | 644 mc. |
| Proton ($H^+$) | 1.008 | $9.6 \times 10^7$ | 15 mc. |
| Oxygen ($O^+$) | 16.000 | $6.04 \times 10^6$ | 3.8 mc. |
| Uranium ($U^+$) | 238 | $4.05 \times 10^5$ | 980 kc. |
| 1 micron diameter iron particle carrying 10,000 elementary units of charge | | 0.3 | 840 c.p.s. |
| 20 micron diameter aluminum particle carrying 0.35 million units of elementary charge | | 0.005 | 109 c.p.s. |

Operation of the present system is specified in the $a_z$—$q_z$ space by a straight line intercepting the origin having a slope $$a_z/q_z = 2V_{dc}/V_{ac} \quad (17)$$

That is to say, for given applied voltages $V_{dc}$ and $V_{ac}$ this operational line determines the range of driving frequency $\Omega/2\pi$ through which a particle of given $e/m$ will be stably bound. Conversely if the frequency is also held constant the $a/q$ operational line specifies the range of $e/m$ values which will be accepted (i.e., higher $e/m$ particles correspond to higher $q$ values). Thus it can be seen that by properly adjusting the ratio of the two voltages so that the operational line just passes one of the edges of the stability curve the $e/m$ acceptance of the chamber can be made quite narrow.

According to the previous discussion, the selection of the values of $V_{ac}$, $V_{dc}$, and $\Omega$ so that the $a_z$ and $q_z$ values are within the stability region of FIG. 3, therefore means that a single charged particle will execute stable vertical and horizontal motions of the forms of Equation 15. Because of the relations between the $a_z$, $a_r$, $q_z$, and $q_r$ coefficients, the motions along the two independent directions will not necessarily be the same. The resultant or $\beta$ frequencies in the two directions, will according to Equations 12 and 16, be in the ratios $$\omega_z = \frac{\beta_z}{\beta_r} = \sqrt{\frac{a_z + \frac{q_z^2}{2}}{-a_r + \frac{q_r^2}{2}}} \quad (18)$$

This can be written as a function of $a_z$ and $q_z$ through Equations 8 and 9 namely;

$$\frac{\omega_z}{\omega_r} = \sqrt{\frac{a_z + \frac{q_z^2}{2}}{-\frac{a_z}{2} + \frac{q_z^2}{8}}} \quad (19)$$

When $a_z = 0$ the above equation shows that the two resultant frequencies are in a 2:1 ratio. Thus the motion, when viewed in the vertical plane, will have the appearance of a 2:1 Lissajou pattern upon which is superimposed the ripple due to the higher frequency terms in solution of Equation 15.

Figure 5:
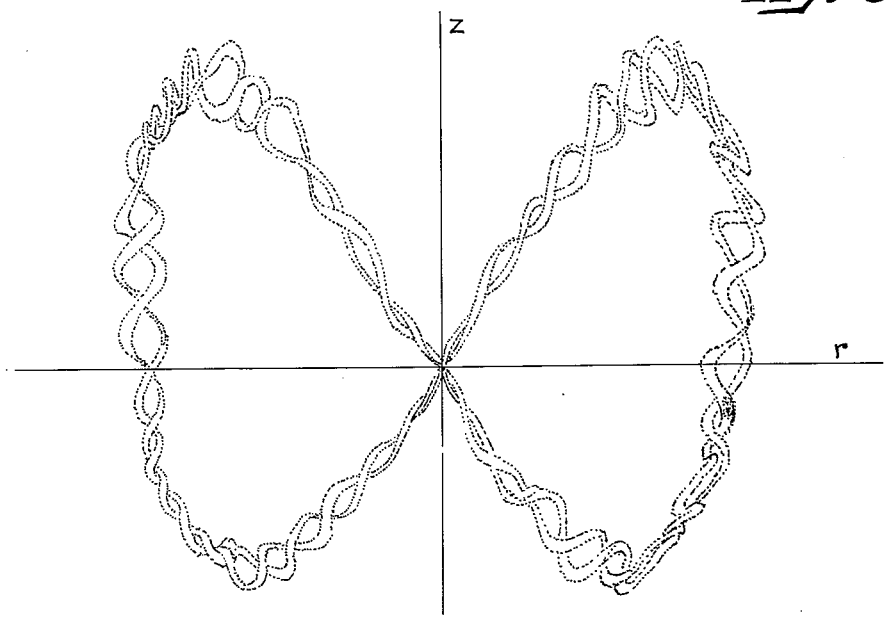
FIG. 5 illustrates a typical oscillatory motion of a single charged particle within the suspension device of FIG. 1.

This is most clearly demonstrated by FIG. 5 showing a tracing taken from a microphotograph of a characteristic 2:1 Lissajou trajectory executed in the $r$—$z$ plane by a single charged particle of aluminum dust contained by a single-phase electrodynamic containment system. For this photograph $Z_0 = 0.250$ inch, $V_{ac} = 500$ volts (r.m.s.); $V_{dc} = 0$, $\Omega/2\pi = 200$ c.p.s.; and $\omega_z/2\pi = 16.3$ c.p.s. From these empirical data one can calculate:

$$e/m = .0053 \text{ coulombs/kilogram}, a_z = 0, q_z = .232, \text{ and}$$
$$\beta_z = .163$$

The addition of the direct voltage source 19 in FIG. 1 in series with the drive voltage source 18 acts to strengthen the effective binding in one of the independent directions at the expense of the other with the result that the resultant vibrational frequencies will be altered. For example, the application of a series voltage $V_{dc}$ so that it is focusing along the $r$ direction (i.e., $a_z$ negative and $a_r$ positive) acts to make up for the inherent geometrical weakness in this direction. The proper addition of D.C. voltage can cause the particle to vibrate with equal resultant motions in both directions (i.e., $\omega_z/\omega_r=1$) and the trajectory will have the over-all appearance of a circular Lissajou pattern. Solution of Equation 19 shows that this condition can occur whenever $a_z \simeq -q_z^2/4$. Further increase in the $r$ focusing past this point will increase the resultant frequency while decreasing still more frequency in the $z$ direction. One can also find a condition for which a single particle will vibrate on the average twice as fast in the $r$ direction as in the $z$ direction. The approximate theory shows that this condition occurs whenever $a_z \simeq -5q_z^2/12$. Further increase in the $r$ focusing will eventually cause the static field to exactly cancel out the binding effect of the drive in the $z$ direction (i.e., $\omega_z/\omega_r=0$). According to Equation 19 the first term in the analytical expression for the boundary line $\beta_z=0$ is given by the equation $a_z=-q_z^2/2$. The other boundary curve in the stability diagram, FIG. 3, corresponding to $\beta_r=0$ (i.e., $\omega_z/\omega_r=\infty$) is to first approximation $a_z=q_z^2/4$.

The discussion has shown that the containment system of FIG. 1 will maintain a particle in dynamic equilibrium and that both the frequencies and the orbit of the particle can be controlled by the externally alternating and static voltage sources (18 and 19 in FIG. 1). Another way of expressing the ability to confine is to say that a particle can find itself in an effective potential well of depth between the outer wall and the center of the container of $$V_{\text{effective}} = \frac{V_{ac}\beta^2}{2q}\left[1+\frac{a}{q}-\frac{\beta^2}{q}\right]^2 \text{ volts} \quad (20)$$

Figure 6:
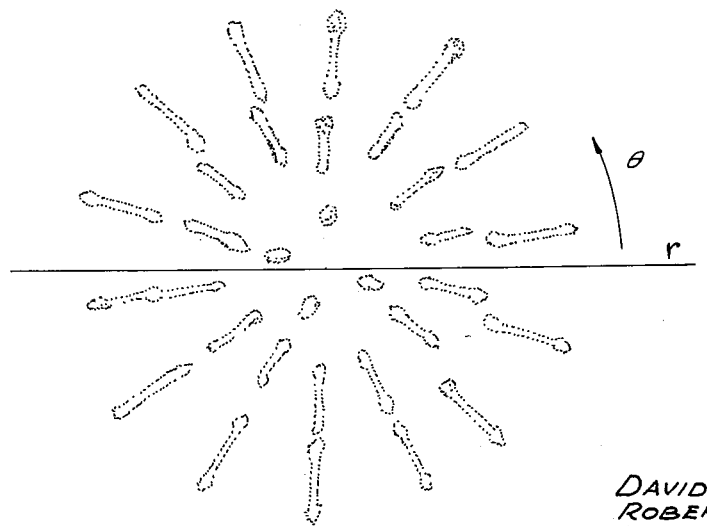
FIG. 6 illustrates a typical crystal-like array of several particles within the suspension device of FIG. 1.
Figure 9:
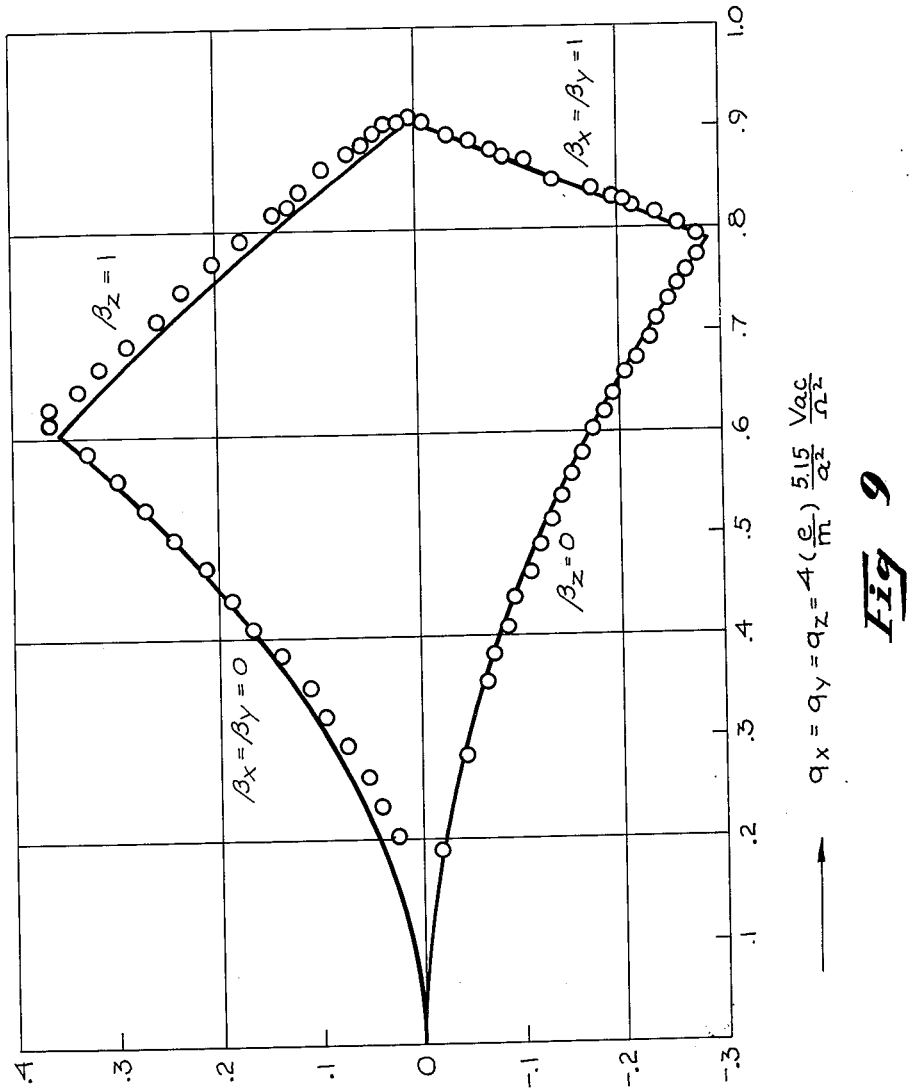
FIG. 9 is a curve illustrating regions of stable oscillation within the device shown in FIG. 7 when $V_{dc_x} = V_{dc_y}$.

Such an effective well is "a priori" a mechanism for the storage of many charged particles. This fact can be most graphically observed and demonstrated when charged particles of dust are injected within the containment region. FIG. 6 has been included to show a tracing taken from a micro photograph of typical array viewed in the $r$-$\theta$ plane through the aperture 25 of the cap electrode 12 of many positive charged particles (thirty two such particles being shown in FIG. 6) contained in device of type presented in FIG. 1. This containment was obtained at $V_{ac}=500$ volts (r.m.s.), $V_{dc}=0$, $\Omega/2\pi=135$ c.p.s., and $\omega_z=43.6$ c.p.s. The average charge to mass ratio of a single particle is $e/m=0.00765$ coulombs/kilogram. The ordered array or "space crystal" results from the removal of the initial energy of motion from the particles. In the case of the dust particles shown in this picture the initial energy was removed by having a background gas pressure, such as air, of the order of several microns of mercury.

When many particles of the same sign are simultaneously contained, the space charge forces of repulsion will serve to alter the resultant frequencies of motion of the individual particles. Assuming the charge to be uniformly distributed throughout the volume of the chamber 10 one can write an expression for the variation in the resultant $z$ and $r$ frequencies due to this space charge when $q_z \lesssim 1/2$; namely $$\beta_z^2 = \left(\frac{2\omega_z}{\Omega}\right)^2 = a_z - \left(\frac{P}{\epsilon_0}\right)\left(\frac{q_zZ_0^2}{2V_{ac}}\right)+\frac{q_z^2}{2} \quad (21)$$

and $$\beta_r^2 = \left(\frac{2\omega_r}{\Omega}\right)^2 = -\frac{a_z}{2} - \left(\frac{P}{\epsilon_0}\right)\left(\frac{q_zZ_0^2}{4V_{ac}}\right)+\frac{q_z^2}{8} \quad (22)$$

where P is the space charge density in coulombs/per cubic meter and $\epsilon_0$ is the permitivity of space.

For the specific cases in which $a_z=0$ the expression for the ratio of the resultant frequencies in the presence of space charge becomes $$\left(\frac{\omega_z}{\omega_r}\right)_{a_z=0} = 2\sqrt{\frac{1-\frac{P(Z_0)^2}{\epsilon_0 q_z V_{ac}}}{1-\frac{2P(Z_0)^2}{\epsilon_0 q_z V_{ac}}}} \quad (23)$$

showing that when $P=0$ the resultant frequencies are in the expected 2:1 ratio. However, with increasing charge density P the ratio of these frequencies diverges, becoming infinite when P reaches its limiting value $$(P\max)_{a_z=0} \simeq \frac{\epsilon_0 q_z V_{ac}}{2Z_0^2} \quad (24)$$

This expression enables the calculation of the maximum charge density which can be stored in the chamber when $a_z=0$. For example if the chamber has a characteristic dimension $Z_0=0.250$ inch then $(P\max)_{a_z=0} \simeq 0.11\ V_{ac}\ q_z$ micro-micro coulombs/cm.$^3$ or equivalently in terms of the number of singly ionized particles;

$$(n\max)_{a_z=0} \simeq 6.9\ V_{ac}\ q_z \times 10^5 \text{ ions/cm.}^3 \quad (25)$$

where $n$ is number of ions or charged particles per cubic centimeter.

The above theory has shown that the present electrodynamic containment system is able to compete against harmonic forces such as those due to externally applied D.C. fields (corresponding to negative $a$ values), those due to space charge, or both. The case of uniform forces such as gravity, effective gravitational forces due to the acceleration of the apparatus, and/or constant electric fields will now be considered. Such forces modify the original Mathieu differential equation of motion to $$\frac{d^2u}{d\xi^2}+(a-2q\cos 2\xi)u=A \quad (26)$$

where A, the normalized constant is related to the physical force F through the transformation equation $$A=\frac{4F}{m\Omega^2} \quad (27)$$

For example when the uniform force results from a voltage $V_g$ applied across the two end caps (12 and 13 in FIG. 1), the expression for the force on a particle within the chamber becomes $$F=\frac{eV_g}{2Z_0} \quad (28)$$

The complete solution of Equation 26 is the sum of the particular integral due to the constant term F and the complementary function, Equation 15. Mathematical analysis shows that within the first region of stability the particular integral of Equation 26 in normalized form is closely $$U_p \simeq \frac{A}{\beta^2}\left[1-\frac{2q}{(4-a)}\cos 2\xi-\frac{2q^2}{(16-a)(4-a)}\cos 4\xi \ldots\right] \quad (29)$$

demonstrating that a uniform force displaces the center of motion by an amount proportional to its magnitude and inversely proportional to the square of the resultant frequency of motion. Thus for the present physical problem, the displacement of the center of the motion when the force is in the $z$ direction is approximately $$z_D = \frac{4F}{\Omega^2\beta^2 m} = \frac{F}{\omega_z^2 m} \quad (30)$$

Further Equation 29 shows that the particle will vibrate about its displaced equilibrium position in opposition to the oscillating drive field. That is to say, the equilibrium oscillatory motion is 180° out of phase with the drive and of magnitude proportional to the normalized $q$ parameter and the displacement. If the equilibrium displacement $A/\beta^2$ equals the dimension of the apparatus the particle is lost. For example, with a macroscopic particle such as a 1 micron diameter piece of iron the gravitational force can cause the particle to "fall out" when the resultant frequency is too small. For such particles gravity will slightly alter the appearance of the lower stability curve shown in FIGURE 2.

The source $V_g$ when used in conjunction with a proper variation of the D.C. quadrupolar source (19 in FIG. 1) can act as a means of ejecting the mass of contained particles out of the electrode structure through either one of the apertures (25 in FIG. 1) in the end caps (12 or 13 in FIG. 1). This method of emptying the chamber is achieved by offsetting the equilibrium position of the plasma with the $V_g$ source and varying $V_{dc}$ towards high negative $a_z$ values. This action will squeeze the contained particles out of the chamber through the aperture which lies in the direction of force field due to $V_g$. This operation can be achieved by a $V_{dc}$ voltage pulse of long enough duration to empty the chamber. The ejected mass of charged particles could then be collected on an external electrode (such as 26 in FIG. 1). The ejected particles could on the other hand be directed to entrance aperture of an accelerating system with the containment chamber functioning as a particle source for a device such as a particle space drive system for a space vehicle.

Having reviewed the effects of the uniform source $V_g$ and/or other uniform force fields, the use of the $\beta$ oscillator (15 in FIG. 1) as a means of exciting the contained particles or plasma will now be considered. When the alternating field due to this source is present the differential equation for the motion in the $z$ direction then becomes:

$$\frac{d^2z}{dt^2}+2\left(\frac{e}{m}\right)\left(\frac{1}{Z_0^2}\right)[\pm V_{dc}-V_{ac}\cos\Omega t]z=\frac{e}{m}\frac{V_\beta}{Z_0}\sin\omega_\beta t \quad (31)$$

or in normalized $a_z$, $q_z$, and $\xi$ form, $$\frac{d^2z}{d\xi^2}+(a-2q\cos 2\xi)z=\left(\frac{e}{m}\right)\left(\frac{4V_\beta}{Z_0}\right)\left(\frac{1}{\Omega^2}\right)\sin\frac{2\omega_\beta}{\Omega}\xi \quad (32)$$

The earlier discussion has shown that the stable solutions of the left hand side of the above Equation 32 contain the frequencies $\omega_z$ (the resultant or $\beta$ frequency), $\Omega-\omega_z$, $\Omega+\omega_z$, $2\Omega-\omega_z$, $2\Omega+\omega_z$, etc. When the frequency of the $\beta$ oscillator equals any one of these discreet frequencies the particle motion will be in resonance with the applied $\beta$ field and the orbit will elongate as energy is fed into the particle or plasma. At resonance the motion will grow according to the expression $$z=-\frac{teV_\beta}{m2Z_0\omega_\beta}\cos\omega_\beta t \quad (33)$$

When the $\beta$ oscillator is adjusted to any one of the Fourier components of the stable motion which result from the action of $V_{ac}$ and $V_{dc}$ energy will be transmitted from the $\beta$ source to the plasma. In this manner the plasma can be "heated." Similarly the presence of the contained particles can be detected by their loading on the $\beta$ circuit when it is in resonance. That is to say, the impedance measured across electrode caps 12 and 13 will dip whenever the plasma is in resonance with the $\beta$ circuit.

Finally consider the effect of the third or pump oscillator (20 in FIG. 1) on a particle which is contained stably by the action of the drive and/or the static sources (18 and 19 in FIG. 1). Since the pump source is in series with the drive sources, it acts to superimpose a second oscillating quadrupole field within the electrode structure of the same spacial form as the drive, namely $$V_p(z,r,t)=-\frac{V_p}{Z_0^2}\left(z^2-\frac{r}{2}\right)^2\cos\omega_p t \quad (34)$$

The differential equation of motion of a single particle in the presence of these three quadrupolar fields now becomes;

$$\frac{d^2z}{dt^2}+2\left(\frac{e}{m}\right)\left(\frac{1}{Z_0^2}\right)\{\pm V_{dc}-V_{ac}\cos\Omega t-V_p\cos\omega_p t\}z=0 \quad (35)$$

and $$\frac{d^2r}{dt^2}+\left(\frac{e}{m}\right)\left(\frac{1}{Z_0^2}\right)\{\mp V_{dc}+V_{ac}\cos\Omega t+V_p\cos\omega_p t\}r=0 \quad (26)$$

One can handle either one of these two more complicated differential equations through suitable approximation. In this case the first two terms in either equation are approximated by the differential equation of simple harmonic motion with the frequency of harmonic oscillation being equated to one of the harmonic components of the stable solution of the Mathieu equation. For example for the case of the $z$ motion one lets $$\frac{d^2z}{dt^2}+2\left(\frac{e}{m}\right)\left(\frac{1}{Z_0^2}\right)\{\pm V_{dc}-V_{ac}\cos t-V_p\cos\omega_p t\}z \rightrightarrows$$

$$\frac{d^2z}{dt^2}+\omega_z^2 z-2\left(\frac{e}{m}\right)\left(\frac{V_p}{Z_0^2}\right)(\cos\omega_p t)z \quad (37)$$

with $\omega_z=\omega_\beta$, or $\Omega-\omega_\beta$, or $\Omega+\omega_\beta$, etc. Mathematically the original complicated Hill equation has been approximated by a Mathieu equation. Such an approximation is fair when $V_p \ll V_{ac}$. According to Mathieu equation theory the above approximate differential equation will have stable or unstable solutions depending upon ratio of the harmonic frequency to the pump frequency. The analysis shows that an unstable solution will exist whenever $$\omega_p=2\omega_z/N \quad (38)$$

where N is an integer. Also in a like manner the motion in the $r$ direction will be unstable whenever $$\omega_p=2\omega_r/N \quad (39)$$

where $\omega_r=\omega_\beta$, $\Omega-\omega_\beta$, $\Omega+\omega_\beta$, etc. The pump source can therefore serve as a second means for transferring energy to the contained particles or plasma. For this mode of excitation the particle motion will be in resonance with the pump oscillator whenever the pump frequency is related according to Equations 38 or 39 to any one of the Fourier frequencies in the stable solutions in $z$ and $r$ of the differential equations of motion in the absence of the pump. For example when the pump frequency is twice the resultant or $\beta$ frequency of motion in the $z$ direction (i.e., $\omega_p=2\omega_z=\beta_z\Omega$) the orbit of a single particle in the $z$ direction will grow exponentially in time as energy is transferred from the pump circuit to the particle according to the equation $$z \simeq \epsilon^{2\left(\frac{e}{m}\right)\left(\frac{V_p}{Z_0}\right)\left(\frac{1}{\omega_p^2}\right)\omega_z t}\left[\sin\left(\omega_z t+\frac{\pi}{4}\right)\right] \quad (40)$$

Like the $\beta$ source, the pump source can also be employed to heat up the plasma of contained particles.

When the resonance condition between the frequency of the pump oscillator and the frequencies of the stable particle motion due to the drive is not fulfilled, the pump source can be gainfully employed to trap simultaneously two particles of widely different charge to mass ratio. For example consider two particles of charge to mass ratios $(e/m)_1$, $(e/m)_2$ such as electrons and protons, protons and charged dust particles, etc. For this case, the motion of each particle will be specified by the differential equations cited in the previous paragraph (Equations 35 and 36). If it is now assumed that $\Omega \gg \omega_p$; the particle of lowest charge to mass ratio will be stably contained by the drive of lowest frequency (assuming of course that the magnitude of $V_{ac}$ is proper) and will be relatively unaffected by the higher frequency $\Omega$. The particle of highest charge to mass ratio will on the other hand be contained by the action of $\Omega$ but its motion will be strongly influenced by the presence of the low frequency drive at frequency $\omega_p$. If $\omega_p$ does not fulfill the resonant condition on the lighter particle, the particle will still be stably maintained.

In summary the above mathematical discussion has outlined the theory by which alternating electric fields can be employed to stably contain charged particles in a manner known in the art of nuclear machines as alternating gradient focusing or hard focusing. Further it has been shown that by the use of other A.C. sources placed either across the end caps, in series with the drive, or both, the particles contained within the pillbox electrode structure 10 can be resonantly excited. Although the above mathematical discussion has dealt with sinusoidally time varying fields, it should be realized that other periodic wave shapes (such as rectangular, triangular, etc.) and phases can also be used to gainfully contain charged particles. The device shown in FIG. 1 can be mounted in an evacuated vessel or continuously pumped container, having suitable insulated and hermetically sealed electric leads, in order to eliminate or control collisions between the electrodynamically contained charged particles and neutral or background gas molecules. Details of a suitable vacuum system are known and need not be presented here.

The electrode structure and the mode of excitation may also take a form other than the cylindrical shape shown in FIG. 1. Referring now to FIG. 7 there is shown an equilateral polygon such as a cube 30, having planar electrode surfaces 31, 32, 33, 34, 35 and 36 with each surface defining a central aperture 41, 42, 43, 44, 45 and 46 respectively. Each pair of opposing surfaces (specifically; 31—33, 32—34, and 35—36) are electrically connected to separate balanced voltage sources (37, 38, and 39 respectively) which serve to apply both an alternating voltage $V_\beta$ and a unidirectional voltage $V_g$ across the three orthogonal x, y, and z directions of the electrode structure. That is to say, source 37 supplies voltages $V_{g_x}$ and $V_{\beta_x} \sin \omega_{\beta_x} t$ across the electrodes 31 and 33, source 38 supplies voltages $V_{g_y}$ and $V_{\beta_y} \sin \omega_{\beta_y} t$ between electrodes 32 and 34 while source 39 supplies across electrodes 35 and 36 voltages $V_{g_z}$ and $V_{\beta_z} \sin \omega_{\beta_z} t$. As explained above, the unidirectional components of the sources 37, 38 and 39 act near the center of the cube 30 to add compensating uniform electric force fields for the purpose of steering or offsetting the equilibrium position of the particles or plasma which is contained within the electrode structure. The alternating components of the three voltage sources 37, 38 and 39, can be employed to excite through resonance either separately or in unison the contained particles at their frequencies of oscillation along the orthogonal x, y, and z directions.

The three sets of opposite electrode surfaces (31—33, 32—34 and 35—36) are next connected at the electrical centers or balance points of the sources 37, 38 and 39 to the high voltage terminals of a Y connected three phase A.C. drive voltage source 50 furnishing across each of its three legs 51, 52 and 53 voltages of the same frequency but phased 120° apart (i.e., $V_{ac_x} \cos (\Omega t + 4\pi/3)$, $V_{ac_y} \cos (\Omega t + 2\pi/3)$, and $V_{ac_z} \cos \Omega t$, respectively). This three phase A.C. drive voltage source 50 acts as the alternating drive at frequency $\Omega$ by which a charged particle or plasma can be stably confined within the cube 30. It is preferred that the three phase A.C. drive voltage source 50 be variable both in magnitude and frequency in order to provide controllable compression or expansion of a multi-particle "plasma mass" contained within the cube 30 and to provide the correct operating conditions for containing particles of a different charge to mass ratio.

The three high voltage terminals of a second Y connected three phase A.C. pump voltage source 54 of frequency $\omega_p$ may be connected to the zero voltage terminals of the three phase A.C. drive voltage source 50. The three phase A.C. pump voltage source 54 has across its three legs 55, 56 and 57 the voltages $V_{p_x} \sin (\omega_p t + 4\pi/3)$, $V_{p_y} \sin (\omega_p t + 2\pi/3)$, and $V_{p_z} \sin (\omega_p t)$ respectively which can act as a second means of exciting through resonance the particles contained as a result of the action of the three phase A.C. drive voltage source 50. Finally unidirectional sources 58 and 59 are connected in series to two of the zero voltage terminals of the A.C. pump voltage source 54. The two D.C. sources 58 and 59 serve to apply voltages of $V_{dc_x}$ and $V_{dc_y}$ (through the sources 50 and 54) to the opposing electrode surfaces 31—33 and 32—34 respectively.

The four quadrupolar voltage sources 50, 54, 58 and 59 act together to establish within the electrode structure of the cube 30 near and about the geometrical center a potential distribution of the form;

$$V(x,y,z,t) = \frac{5.15 V_{ac}}{d^2}[x^2 \cos(\Omega t + 4\pi/3) + y^2 \cos(\Omega t + 2\pi/3)$$
$$+ z^2 \cos(\Omega t)] + \frac{5.15 V_p}{d^2}[x^2 \cos(\omega_p t) + 4\pi/3 + y^2 \cos(\omega_p t + 2\pi/3)$$
$$+ z^2 \cos \omega_p t] + \frac{2(5.15) V_{dc_x}}{3d^2}\left[x^2 - \left(\frac{y^2+z^2}{2}\right)\right]$$
$$+ \frac{2(5.15) V_{dc_y}}{3d^2}\left[y^2 - \left(\frac{x^2+z^2}{2}\right)\right] + (V_{dc_x} + V_{dc_y})/3 \quad (41)$$

where $d$ is the width of the electrode structure (i.e., the distance between 31 and 33). Inspection shows that the above potential distribution satisfied the Laplace equation (i.e., $\nabla^2 V(x,y,z,t)=0$). The differential equations of motion of a charged particle in this electrical potential are found by solving for the fields in the three orthogonal directions of space and using Newton's law of motion. The mathematical analysis shows that three equations of motion are of the form;

$$\frac{d^2u}{d\xi^2} + [a - 2q \cos(2\xi + \psi)]u - 2q'\left[\cos\left(\frac{2\omega_p \xi}{\Omega} + \psi\right)\right]u = 0 \quad (42)$$

Here $u$ stands for either $x$, $y$, or $z$ and $\xi = \Omega t/2$. The values of $a$, $q$, and $q'$ for the three Cartesian directions are $$q_x = q_y = q_z = -4\left(\frac{e}{m}\right)\left(\frac{5.15 V_{ac}}{a^2}\right)\left(\frac{1}{\Omega^2}\right) \quad (43)$$

$$a_x = \left(\frac{16}{3}\right)\left(\frac{e}{m}\right)\left(\frac{5.15}{a^2}\right)\left(\frac{1}{\Omega^2}\right)[V_{dc_x} - V_{dc_y}/2] \quad (44)$$

$$a_y = \left(\frac{16}{3}\right)\left(\frac{e}{m}\right)\left(\frac{5.15}{a^2}\right)\left(\frac{1}{\Omega^2}\right)[V_{dc_y} - V_{dc_x}/2] \quad (45)$$

$$a_z = \left(\frac{8}{3}\right)\left(\frac{e}{m}\right)\left(\frac{5.15}{a^2}\right)\frac{1}{\Omega^2}(V_{dc_x} + V_{dc_y}) \quad (46)$$

$$q_x' = q_y' = q_z' = q_x \frac{V_p}{V_{ac}} \quad (47)$$

$$\psi_x = 4\pi/3$$
$$\psi_y = 2\pi/3 \quad (48)$$
$$\psi_z = 0$$

Laplace's equation moreover requires that;

$$a_x + a_y + a_z = 0$$

When the pump voltage is removed (i.e., $V_p = q' = 0$) the differential equation of motion (Equation 42) reduces to the Mathieu differential equation (Equation 6). That is to say, the motion of a charged particle will be stable in $x$, $y$ and $z$ directions when the values of $a_x$ and $q_x$, $a_y$ and $q_y$, $a_z$ and $q_z$ lie within their limiting stability curves (as in the case of FIG. 2). Further, if $V_{dc_x} = V_{dc_y}$ then Equation 49 gives a relation between $a_z$ and $a_x$ or $a_y$ and the $x$ and $y$ stability extremes can be plotted on the $a_z$–$q_z$ stability diagram.

FIGURE 8 shows the stability diagram for the cubical electrode structure of FIG. 7 when $V_{dc_x}=V_{dc_y}$, and $V_p=0$. In this diagram the solid line passes through the theoretical values presented in FIG. 2 while the circles locate the experimentally determined ($\Omega=400$ cycles/second) boundaries between stable and unstable single particle operation.

The question of the range of driving frequency and drive voltage $V_{ac}$ necessary to contain a particle of charge to mass ratio $e/m$ is answered by calculating the $q$ values given by Equation 43. The results of such a calculation can be presented either tabularly or in the nomogram form. The results which have been cited in Table 1 or the nomogram of FIG. 4 for a single phase chamber of characteristic dimensions $Z_0=0.250$ inch can also be applied to a three phase cube 30 of width $d=0.567$ inch.

When the particle is stable three dimensionally, it will execute vibratory motions in $x$, $y$, and $z$ of the form of Equation 15, having resultant or $\beta$ frequencies of oscillation for small values of $q$ given by Equation 16; i.e., $$\beta_x = \frac{2\omega_x}{\Omega} \simeq \sqrt{a_x + q_x^2/2} \qquad (50)$$

$$\beta_y = \frac{2\omega_y}{\Omega} \simeq \sqrt{a_y + q_y^2/2} \qquad (51)$$

and $$\beta_z = \frac{2\omega_z}{\Omega} \simeq \sqrt{a_z + q_z^2/2} \qquad (52)$$

where $q \leqslant 1/2$.

That is to say, the motion in each of the three independent directions will consist of a large oscillation at the normalized frequency $\beta$ upon which is superimposed the smaller more rapid oscillations at the higher normalized frequencies $2-\beta$, $2+\beta$, $4-\beta$, $4+\beta$, etc. For example, when $V_{dc_x}=V_{dc_y}=0=V_p$ the effective focusing is isotropic and a single particle will execute a 1:1 Lissajou pattern upon which is superimposed the ripple motion due to the higher frequency components.

FIG. 10 shows a tracing from a microphotograph of an array of positively charged aluminum dust particles contained with the cubical electrode structure of FIG. 7 by the action of the drive (source 50 in FIG. 7) and the static quadrupolar fields (sources 58 and 59 in FIG. 7). For this photograph, $d=1+5/32$ inches, $\Omega/2\pi=60$ cycles/second, $V_{ac}=208$ volts r.m.s., $V_{dc_x}=V_{dc_y}=-44$ volts, and $V_{g_z}=-27$ volts. The unidirectional component $V_{g_z}$ of source 39 was employed in this instance to counteract the gravitational forces acting upon the individual particles. The picture further illustrates that in the cubical electrode structure the particles (which are held away from the center of the chamber by space charge forces of repulsion) execute individually elliptical orbits about their equilibrium positions as a result of the 120° phase difference between the three A.C. drive signals.

The other voltage sources shown in FIG. 7, (specifically 37, 38, 39 and 54) serve as a means of exciting or steering the contained charged particles or plasma about the interior of the electrode structure. The unidirection components $V_{g_x}$, $V_{g_y}$ and $V_{g_z}$ add a constant uniform electric force field near the center of the electrode structure of the form $$E_{x,y,z} \simeq \frac{V_{g_{x,y,z}}}{a} \qquad (53)$$

Such forces serve, as has been seen from the discussion of Equations 26–30 to displace the center of motion by an amount proportional to the applied force and inversely proportional to the square of the resultant frequency of motion. Unlike the single phase containment system as it is shown in FIG. 1, the three phase device has the ability to offset the contained particle mass along any one of the three orthogonal directions of space. However, it is realized that the ring electrode 11 in FIG. 1 could be split in quadrants with unidirectional sources added to opposite sectors.

According to the above discussion, the three-phase containment system can be used as a three-dimensional accelerometer or as a gravity meter. An accurate accelerometer is particularly valuable in autopilot systems to determine both the velocity of a craft and the instantaneous location. This device is particularly suited for such an application since the focusing due to the A.C. drive voltage is isotropic. Thus when a single charged dust particle 60, FIG. 8, of several microns or more in size is placed within the electrode structure of the cube 30 with a background gas pressure of around several microns of mercury, the particle 60 (in the absence of any gravitational or externally applied uniform forces) will settle as a function of the background gas pressure to the geometrical center of the cube 30. The application of a gravitational force or an accelerating force due to the acceleration of the electrode structure will upset the equilibrium position of the particle 60 by amounts along the $x$, $y$ and $z$ directions, (according to Equation 29), proportional to the vector components of the applied force. Using $V_{g_x}$, $V_{g_y}$ and $V_{g_z}$, (FIG. 7), the displacement can be counteracted by opposing electric fields, the magnitudes of which could serve as a measure of the applied gravitational force $g$. That is to say, the $V_g$ electric force required to return the macroparticle 60 back to the center of the cube 30 would measure directly the applied gravitational force $$\left(\text{i. e., } g_x = \frac{e}{m} V_{g_x}/a\right)$$

Thus the particle 60 is continuously maintained at the center of the electrode structure in a charging gravitational field (which is being measured) by a balanced optical servo system which controls the magnitudes of $V_{g_x}$, $V_{g_y}$, $V_{g_z}$.

Although details of such an optical feedback system are known and need not be presented fully here, FIG. 8 illustrates a simplified optical locating arrangement of the type usable in an accelerometer utilizing the cube 30 containing the single dust particle 60 which is illuminated by a light source such as a carbon arc 61 and a lens 61a. Light reflected from the particle 60 passes through the aperture 42 in the surface 32, through a lens 62, and an optical wedge 63 to energize a photocell 64. Motion of the particle 60 in the $z$ direction will cause the image to pass through the variable density optical wedge 63 to provide a variable light intensity signal $S_o$ from the circuit including the photocell 64, a battery 65 and a tuning rheostat 66. This signal $S_o$ is compared to a reference signal $S_r$ in a difference amplifier 67 to provide a control signal $S_c$. It is preferred that the reference signal $S_r$ be a function of the light intensity of the light source such as the carbon arc 61, so that variations of the light source will be compensated automatically. This may be accomplished by providing another photocell 68 in line with the light beam from the arc 61 with the signal from the photocell 68 passing through a reference network 69 to provide the desired signal $S_r$. The accelerometer may be rotatably mounted on a pendulum-like structure (not shown) so that a single signal $S_c$ is provided, but it is preferred that three such signals $S_c$ be provided by photocell systems of the type illustrated by components 61–67 so that each of the signals ($S_c$) may correspond to a displacement of the particle 60 in each of the $x$, $y$ and $z$ directions.

Referring again to FIG. 7, the A.C. components of the sources 37, 38 and/or 39 can be used to excite or resonate (according to the discussion of Equations 31—33) the contained particles whenever the frequencies of these sources equals any one of the oscillatory frequencies of the contained particles, Equation 15. Thus a particle or plasma can be excited in the $z$ direction by the A.C. component of the source 39 when the frequency of this source equals any one of the z vibrational frequencies of the particle (i.e. $\omega_z$, $\Omega-\omega_z$, $\Omega+\omega_z$ ... ). In a like manner the plasma can also be excited along the y direction by the source 38, and/or in the direction by the source 37. Thus the system may be used to detect rapidly varying gravitational forces in any one of the x, y or z directions.

The quadrupolar source (54 in FIG. 7) serves in still another way of exciting or resonating the contained particles or plasma. The mathematics of this mode of resonance has been previously discussed in Equations 34–40. When applied to the three phase system it is found that the A.C. pump voltage source 54 will transfer energy to the plasma and coherently excite it whenever its frequency is related according to Equation 38 to any one of vibrational frequencies in either x, y, or z, of the contained particles. For the three phase system quadrupole resonance will occur when, $$\omega_D = \frac{2\omega_{x,y,z}}{n} \quad (54)$$

where n is an integer and $\omega_{x, y, z}$ are the stable oscillatory frequencies due to the several drive voltages respectively. Equation 54 assumes that $V_p \ll V_{ac}$. Further it should be realized that although the A.C. pump voltage source 54 has been shown as a Y connected to three phase generator in FIG. 7, such a requirement is really not necessary. For example, a single phase A.C. generator could equally well have been shown (i.e., the voltages in two legs 55 and 56 could have been shorted out) without changing the resonance condition shown by Equation 54.

The above discussion has demonstrated the manner in which alternating three phase voltage can be used to stably contain charged particles within the cube 30 in a manner known in the art of nuclear machines as alternating gradient focusing. Moreover, means of resonantly exciting the particles have been demonstrated. Also means for steering or offsetting the equilibrium positions of the contained particles have been demonstrated. Although the above mathematical discussion of the three phase system has dealt with sinusoidally time varying fields, it should be realized that other periodic wave shapes (such as rectangular, triangular, etc.) could be used. Finally it should be realized that the phase condition on the A.C. drive voltage is not in the least strict and that the system is capable of containing particles within the cube 30 for any phase (0–360°) between the adjacent legs of the A.C. drive voltage source 50. For example, if the two legs 51 and 52 were shorted out, then the fields due to the A.C. drive voltage source 50 would have the form of Equations 2 and 3 and the device would function like the single phase system shown in FIG. 1. In order to eliminate undesired collision between the contained charged particles and uncharged particles such as air, the containment device shown in FIG. 7 can be mounted in an evacuated vessel or vacuum system 92 (FIG. 8), having insulated vacuum-tight electrical leads (not shown) for connecting to the controllable external voltage sources. Details of a suitable vacuum system are known and need not be presented herein.

Figure 11:
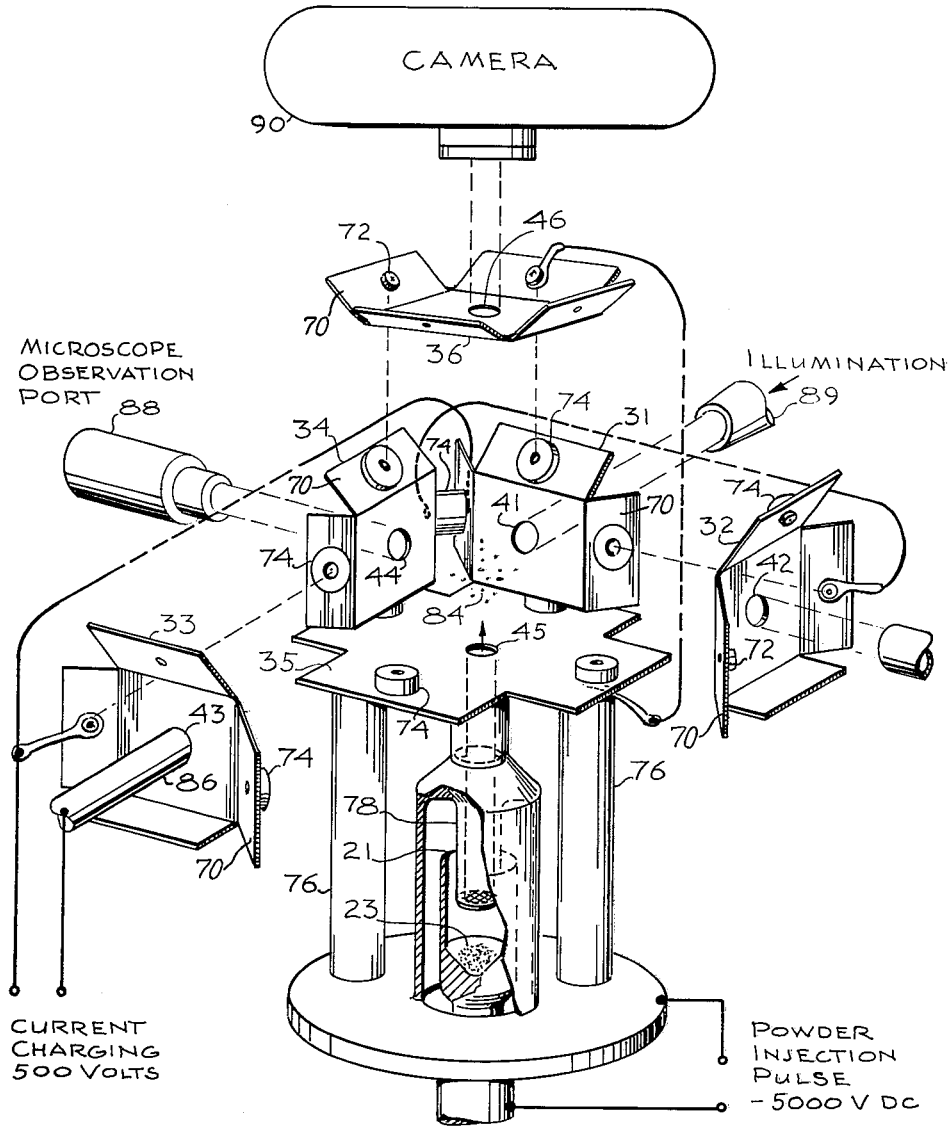
FIG. 11 is an exploded perspective detailed view of the chamber illustrated in FIG. 7 showing certain auxiliary equipment.

Referring now to FIG. 11 showing an exploded view of one particular chamber which chamber has been tested and operated in accordance with the above theory. The cube 30 has inner dimensions (d) of $1+\frac{5}{32}''$ with each of the six separate surfaces 31—36 being $\frac{1}{16}''$ thick aluminum members. In order to obtain a simple self-supporting structure, the edges of the aluminum members are provided with 45° flanges 70 to facilitate insulating supports between each side of the cube 30. The flanges 70 of adjacent edges may be secured by insulating screws 72 of a material such as nylon or porcelain and spaced apart by insulating washers such as $\frac{3}{16}''$ thick Lucite spacers 74. The apertures 41—48 defined in the central region of each surface 31—36 respectively are $\frac{3}{16}''$ in diameter. It is suggested that all inner surfaces of the cube 30 be painted with a non-reflecting covering, such as aquadag, to reduce the problem of spurious light reflections. It is also preferred that the chamber be completely insulated from surrounding devices by the use of some supporting device such as ceramic spacers 76 supportingly engaging the lower surface 35.

During one type of operation, aluminum macroparticles 60 having an average diameter of approximately 10 microns are initially stored in the powder reservoir 23 provided with an upwardly opening aperture 21 beneath the aperture 45 of the lower surface 35 of the suspension device. Particle injection into the suspension chamber of the cube 30 is effected by pulsing the powder reservoir 23 with a high voltage such as a 5,000 volt negative potential relative to an anode-like portion 78 of the particle gun including the reservoir 23. This results in the entrance of a cloud 84 of the charged particles 60, through the aperture 45 where they come within the current stream of an electron or ion gun 86 positioned to cause substantial electron flow through another aperture such as the aperture 43. The electron gun 86 is maintained at a negative 500 volts relative to the cube 30 so that the eleectrons impinge upon the particles 60 at a relatively high velocity. Thus electrons are accelerated into the suspension chamber of the cube 30 to impinge upon and further charge at least some of the aluminum dust particles 60 within the cloud 84. Even without use of the electron gun 86 a few of the dust particles 60 are of sufficient charge to be contained within the containment fields. Moreover, the electron gun 86 may be replaced by an ion gun. Only charged aluminum particles 60 remain within the suspension chamber where they may be observed by a simple microscope 88 positioned adjacent to another aperture, such as the aperture 44 or 42, with illumination of the field of view of the microscope 88 being provided at 90° through the aperture 31 by a carbon arc light source 89. Also a camera 90 may be placed over an observation aperture such as the aperture 46. On the other hand, resonance of the particles may be detected electronically.

Referring again to both FIGS. 7 and 11, one suitable arrangement of the A.C. drive voltage source 50 utilized in supporting aluminum dust particles 60 provides as much as 1200 volts at 400 cycles and the alternating voltage β oscillator sources 37, 38 and 39 provide as much as 450 volts at 60 cycles. Actually only one β oscillator source was used during certain of the testing work using the device of FIG. 11. The unidirectional voltage supplies 58 and 59 are variable up to a maximum of 500 volts and the unidirectional voltage supply 37 is on the order of 90 volts. By varying the voltage source 39, the electrostatic voltage $V_g$ between the top and bottom surfaces 35 and 36 may be adjusted to cancel the effect of gravity, a greater or lesser amount, whereby the particles under suspension may be moved vertically up or down toward or away from the center of the electrode structure of the cube 30. With the provision of a three-phase alternating voltage source connected to mutually perpendicular pairs of plate surfaces respectively (FIG. 7), the oscillatory motion of each of the particles 60 within a crystal-like structure is an elliptical-shaped particle trajectory as shown in FIG. 10. This results from the effect that the drives exerted on each particle are in three perpendicular directions which are 120° out of phase with each other, with the motions in these three directions being similarly 120° out of phase. If the voltages or frequencies are changed slightly or if the background vacuum is changed, the crystal-like structure (FIGS. 6 and 10) will "melt," and although suspension may be maintained and the mean average of the particle "mass" may remain fixed, the relative location between each particle changes rapidly. A melted particle mass will have a cloud-like appearance. With a plurality of particles under suspension, as shown in FIGS. 6 or 10, increasing the voltage of the unidirectional voltage source 39 may be utilized to cause a few of the uppermost particles 60 to become unstable and leave the region of the oscillating support. Thus the number of particles under suspension may be reduced. This process may be continued until only one particle 60 remains, whereupon the observation of this single particle is possible. Although the cube 30 of FIGS. 8 and 11 is placed in an evacuated container 92 (FIG. 8), means such as a vacuum pump (not shown) are provided for reducing the vacuum. Usually in a continuously pumped system there is provided a throttle (or leak) valve means 93 to raise the background pressure to a value on the order of around a micron or two so that the particles 60 will be damped to form a stable array in a matter of a few minutes.

While there have been shown and described several embodiments of the present invention, other modifications may occur to those skilled in the art. For instance, it is understood that for either one of these containment systems (see FIGS. 1 or 7), the drive voltage $V_{ac}$ and/or the unidirectional voltage $V_{dc}$ is actuable by a step function. In this manner particles charged externally to the electrode structure will be trapped as they pass into the confinement space. The A.C. drive (and/or the D.C. series voltage) would in this case be turned on and controlled by an electronic network timed to turn the drive voltage on at the instant that the charged particle mass reaches the center of the confinement space. Furthermore, in the earlier paragraphs it was explained that the contained particle mass can be ejected from one of the apertures, for example, 25 in FIG. 1, or 41—46 in FIG. 7, by properly varying the magnitude of the static voltage source $V_{dc}$ (19 in FIG. 1 or 58 and 59 in FIG. 7). It should be realized that the time rate of change of this voltage will determine the duration of the ejected current stream. Thus a step in the series voltage source will cause particles to be ejected as a pulse. A linear variation of the magnitude of $V_{dc}$ will cause particles to issue out as a current stream of length determined by the time rate of change of the series source. Also only a portion of the particle mass may be ejected by such a pulse. Therefore it is intended by the appended claims to cover all such modifications as fall within the true spirit and scope of this invention.

We claim:

1. A particle containment and observation device, comprising: conductive surfaces defining a containment space; electric circuit means selectively connected to said surfaces for providing electric fields in the containment space defined thereby; means for injecting charged dust particles of a size on the order of a micron or more into the containment space; means for controlling said electric circuit means to control the electric fields to provide three-dimensional alternate gradient focusing containment of the charged particles; and means for detecting and observing the particles.

2. A particle containment and observation device, comprising: conductive surfaces defining a containment space with a plurality of said surfaces having apertures therethrough; electric circuit means selectively connected to said surfaces for providing electric fields in the containment space defined thereby; a source of dust particles positioned adjacent to one of the apertures; means for injecting charged particles from said source into the containment space; means for controlling said electric circuit means to control the electric fields to provide three-dimensional alternate gradient focusing containment of the charged particles; means positioned adjacent to a second of the apertures for illuminating the contained particles; and means positioned adjacent to another of the apertures for allowing the observation of the illuminated particles.

3. A particle containment and observation device, comprising: conductive surfaces defining a containment space; electric circuit means selectively connected to said surfaces for providing electric fields in the containment space defined thereby; a source of chargeable dust particles of a size on the order of at least one micron positioned adjacent to one of the apertures; means for injecting charged particles from said source into the containment space; means for controlling said electric circuit means to provide three-dimensional alternate gradient focusing containment of the charged particles; and means for detecting and observing the particles.

4. A particle containment and observation device, comprising: conductive members having inner surfaces defining a containment space, with a plurality of said surfaces having apertures therethrough; electric circuit means selectively connected to said surfaces for providing electrodynamic fields in the containment space defined thereby; a source of particles positioned adjacent to one of the apertures; means for injecting particles from said source into the containment space; means adjacent to a second of the apertures and focusable therethrough for charging the injected particles; means for controlling said electric circuit means to provide three-dimensional alternate gradient focusing containment of the charged particles; means positioned adjacent to a third of said apertures for illuminating the contained particles, said surfaces being provided with a substantially non-reflective coating facing the containment space; and means positioned adjacent to a fourth of the apertures for allowing the observation of the illuminated particles.

5. A particle containment and observation device, comprising: conductive surfaces defining a containment space, with a plurality of said surfaces having apertures therethrough electric circuit means selectively connected to said surfaces for providing electro-dynamic fields in the containment space defined thereby; a source of particles positioned adjacent to one of the apertures; means for injecting charged particles from said source into the containment space; means adjacent a second of the apertures and focusable therethrough for further charging the injected particles; means for controlling said electric circuit means to provide three-dimensional alternate gradient focusing containment of the charged particles; and means for detecting and observing the contained particles.

6. A particle containment and observation device, comprising: metal surfaces defining a containment space, with each of said surfaces having a central aperture; electric circuit means selectively connected to said surfaces for providing electro-dynamic fields in the containment space defined thereby; means for injecting charged particles through one of the apertures into the containment space; an electron gun focused through a second of the apertures for further charging the injected particles; means for controlling said electric circuit means to provide three-dimensional alternate gradient focusing containment of the charged particles; means positioned adjacent to a third of the apertures for illuminating the contained particles; and optical magnifying means positioned adjacent to a fourth of the apertures for allowing the observation of the illuminated particles.

7. A particle containment and observation device, comprising: pairs of mutually perpendicular metal surfaces defining a cubical containment space, with each of said surfaces having a central aperture; electric circuit means selectively connected to said pairs for providing electrodynamic fields in the containment space defined thereby; means for injecting charged macroparticles through one of the apertures into the containment space; an electron gun focused through second of the apertures for further charging the injected particles; means for controlling said electric circuit means to control the electro-dynamic fields resulting in three-dimensional alternate gradient focusing containment of the charged particles; means positioned adjacent to a third of the apertures for illuminating the contained particles, and optical magnifying means positioned adjacent to a fourth of the apertures for allowing the observation of the illuminated particles.

8. A particle containment and observation device, comprising: metal members having inner surfaces defining a containment space, within an evacuated container, with each of said surfaces having a central aperture; electric circuit means selectively connected to said surfaces for providing electro-dynamic fields in the containment space defined thereby; means for injecting visually observable charged particles through one of the apertures into the containment space; a charged particle gun focused through a second of the apertures for further charging the particles; means for controlling said electric circuit means to provide three dimensional alternate gradient focusing containment of the charged particles; means positioned adjacent to a third of the apertures for illuminating the contained particles; means for regulating the background pressure within the evacuated container; and optical magnifying means positioned adjacent to a fourth of the apertures for allowing the observation of the illuminated particles, said control means being variable to provide a stable containment wherein each illuminated particle has a fixed mean average location relative to other illuminated particles with the result that the particle array observed is crystal-like.

9. A particle containment and observation device, comprising: pairs of mutually perpendicular metal members having inner surfaces defining a containment space, within an evacuated container, with each of said members having a central aperture, and each of said surfaces having non-reflecting coating thereon; electric circuit means selectively connected to said pairs for providing electrodynamic fields in the containment space defined thereby; means for injecting visually observable charged particles through one of the apertures into the containment space; means for controlling said electric circuit means to provide three-dimensional alternate gradient focusing containment of the charged particles; means positioned adjacent to a second of the apertures for illuminating the contained particles; means for regulating the background pressure within the evacuated container; and optical magnifying means positioned adjacent to a third of the apertures for allowing the observation of the illuminated particles, said control means being variable to provide a stable containment wherein each illuminated particle has a fixed mean average location relative to other illuminated particles with the result that the particle array observed is crystal-like.

10. A particle containment and observation device, comprising: conductive metal members having inner surfaces defining a containment space with a plurality of said surfaces having apertures therethrough; electric circuit means selectively connected to said surfaces for providing electric fields in the containment space defined thereby, at least one charged dust particle in the containment space; means for controlling said electric circuit means to provide three-dimensional alternate gradient focusing containment of the charged dust particle; and means for detecting and observing the charged dust particle.

11. A particle containment and observation device, comprising: pairs of mutually perpendicular metal surfaces defining a cubical containment space, with each of said surfaces having a central aperture; electric circuit means selectively connected to said pairs for providing electro-dynamic fields in the containment space defined thereby; a charged macroparticle within the containment space; means for controlling said electric circuit means to provide three-dimensional alternate gradient focusing containment of the charged macroparticle; means positioned adjacent to the containment space and focused therein for illuminating the contained macroparticle; and optical magnifying means positioned adjacent to one of the apertures for allowing the observation of the illuminated macroparticle.

12. A particle containment and observation device, comprising: conductive surfaces defining a containment space; electric circuit means selectively connected to said surfaces for providing electric fields in the containment space defined thereby; means for injecting charged particles of a first type and of a second type of charge to mass ratio into the containment space; means for controlling said electric circuit means to provide different frequency electro-dynamic fields resulting in three-dimensional alternate gradient focusing containment of both the first and second types of charged particles; and means for detecting and observing the contained particles.

13. A particle containment and observation device, comprising: pairs of mutually perpendicular metal members having inner surfaces defining a containment space, within an evacuated container, with at least one of said members having a central aperture; electric circuit means selectively connected to said pairs for providing electro-dynamic fields in the containment space defined thereby; at least one charged dust particle within the containment space; means for controlling said electric circuit means to provide three-dimensional alternate gradient focusing containment of the charged particle; means positioned adjacent to the containment space for illuminating the contained particle; means for regulating the background pressure within the evacuated container; and optical means positioned adjacent to at least the one aperture for detecting the presence and location of the illuminated particle, said control means being variable to provide a stable containment wherein the illuminated particle has a fixed mean average location.

14. A particle containment and observation device, comprising: pairs of mutually perpendicular metal members having inner surfaces defining a containment space, within an evacuated container, with at least one of said members having a central aperture; electric circuit means selectively connected to said pairs for providing electro-dynamic fields in the containment space defined thereby; at least one charged dust particle within the containment space; means for controlling said electric circuit means to provide three-dimensional alternate gradient focusing containment of the charged particle; means positioned adjacent to the containment space for illuminating the contained particle; means for regulating the background pressure within the evacuated container to damp the motion of the particle, said control means being variable to provide a stable containment wherein the illuminated particle comes to rest at the center of the containment space; and optical means including balanced photocell arrangement positioned adjacent to at least the one aperture for detecting the presence and location of the illuminated particle and providing a signal indicative of the displacement of the particle from the center.

15. A particle containment and observation device usable as an accelerometer comprising: metal members having inner surfaces defining a containment space, within an evacuated container, with at least one of said members having a central aperture; electric circuit means selectively connected to said members for providing electro-dynamic fields in the containment space defined thereby; one charged dust particle within the containment space; means for controlling said electric circuit means to provide three-dimensional alternate gradient focusing containment of the charged particle; means positioned adjacent to the containment space for illuminating the contained particle; a background pressure within the evacuated container of a magnitude which will damp the motion of the particle, said control means being variable to provide a stable containment wherein the illuminated particle comes to rest near the center of the containment space; and optical means including balanced photocell arrangement positioned adjacent to at least the one aperture for detecting the presence and location of the illuminated particle along one axis of the containment space and providing a signal indicative of the displacement of the particle from the center.

16. A particle containment and observation device, usable as an accelerometer, comprising: pairs of mutually perpendicular metal members having inner surfaces defining a containment space, within an evacuated container, with at least one of said members of each pair having a central aperture; electric circuit means selectively connected to said mutually perpendicular pairs for providing electro-dynamic fields in the containment space defined thereby; one charged dust particle within the containment space; means for controlling said electric circuit means to provide three-dimensional alternate gradient focusing containment of the charged particle; means positioned adjacent to the containment space for illuminating the contained particle; a background pressure within the evacuated container of a magnitude which will damp the motion of the particle, said control means being variable to provide a stable containment wherein the illuminated particle comes to rest near the center of the containment space; and optical means including balanced photocell arrangement positioned adjacent to one of the apertures in each of said mutually perpendicular pairs for detecting the presence and location of the illuminated particle along each axis of the containment space and providing a signal indicative of the displacement of the particle from the center.

17. A particle containment and observation device, comprising: metal surfaces defining a containment space, with each of said surfaces having a central aperture; electric circuit means selectively connected to said surfaces for providing electro-dynamic fields in the containment space defined thereby; means for injecting charged particles through one of the apertures into the containment space; voltage step producing means for controlling said electric circuit means to provide the electric fields resulting in three-dimensional alternate gradient focusing containment of the charged particles when the particles have entered the containment space.

18. A particle containment device, comprising: conductive surfaces defining a containment space; charged particles within the containment space; first electric circuit means selectively connected to said surfaces for providing three-dimensional alternate gradient focusing containment of the charged particles; and second electric circuit means connected to said surfaces for exciting through resonance the contained particles.

19. A particle containment and ejection device, comprising: members each having an inner conductive surface defining a containment space with at least one of said members having an aperture therethrough; charged particles within the confinement space; electric circuit means selectively connected to said members for providing electric fields resulting in three-dimensional alternate gradient focusing containment of the charged particles; and means connected to said electric circuit means for varying the electric fields to selectively eject at least a portion of the charged particles contained in a predetermined direction.

20. A particle containment and observation device, comprising: conductive surfaces defining a containment space; electric circuit means selectively connected to said surfaces for providing electric fields in the containment space defined thereby; and means for injecting charged dust particles of a size on the order of a micron or more into the containment space; said electric circuit means including a first alternating frequency source for containment of said particles and a second alternating frequency source for pumping said particles.

21. A particle containment and observation device, comprising: conductive surfaces defining a containment space; electric circuit means selectively connected to said surfaces for providing electric fields in the containment space defined thereby; and means for injecting charged dust particles of a size on the order of a micron or more into the containment space; said electric circuit means including a first alternating frequency source for containment of said particles and a second alternating frequency source for pumping said particles, said first and second alternating frequency sources being series connected.

22. A particle containment and observation device, comprising: conductive surfaces defining a containment space; electric circuit means selectively connected to said surfaces for providing electric fields in the containment space defined thereby; and means for injecting charged dust particles of a size on the order of a micron or more into the containment space; said electric circuit means including a first alternating frequency source for containment of said particles and a second alternating frequency source for pumping said particles, said second alternating frequency source being connected to only a portion of said conductive surfaces.

References Cited in the file of this patent

UNITED STATES PATENTS

| | | |
|---|---|---|
| 2,718,610 | Krawinkel | Sept. 20, 1955 |
| 2,837,693 | Norton | June 3, 1958 |
| 2,868,991 | Josephson et al. | Jan. 13, 1959 |
| 2,895,067 | Deloffre | July 14, 1959 |
| 2,904,411 | Pfann | Sept. 15, 1959 |

OTHER REFERENCES

Foley's College Physics, fourth edition, revised by J. L. Glathart, 1947, pages 348 and 349.